UNITED STATES PATENT OFFICE.

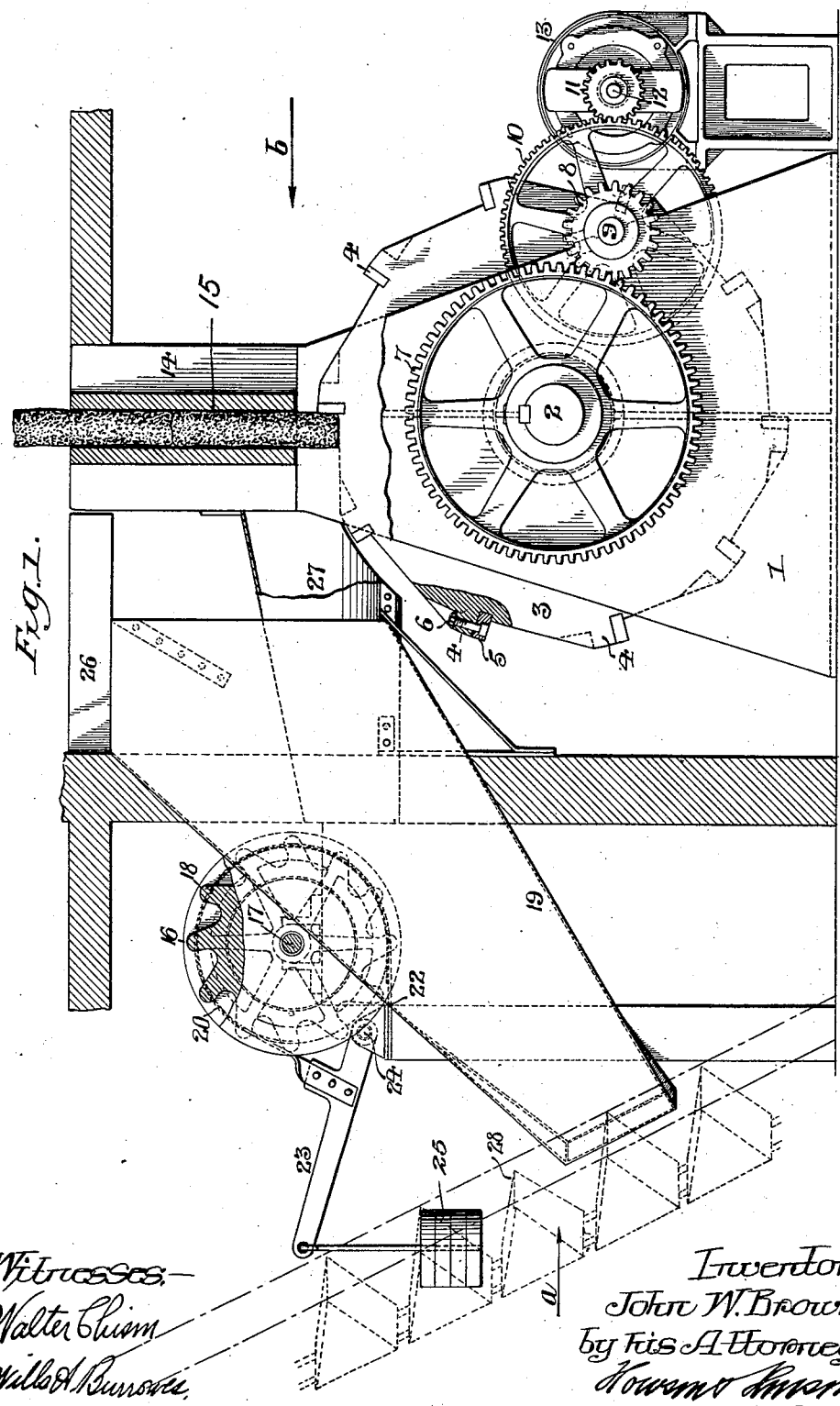

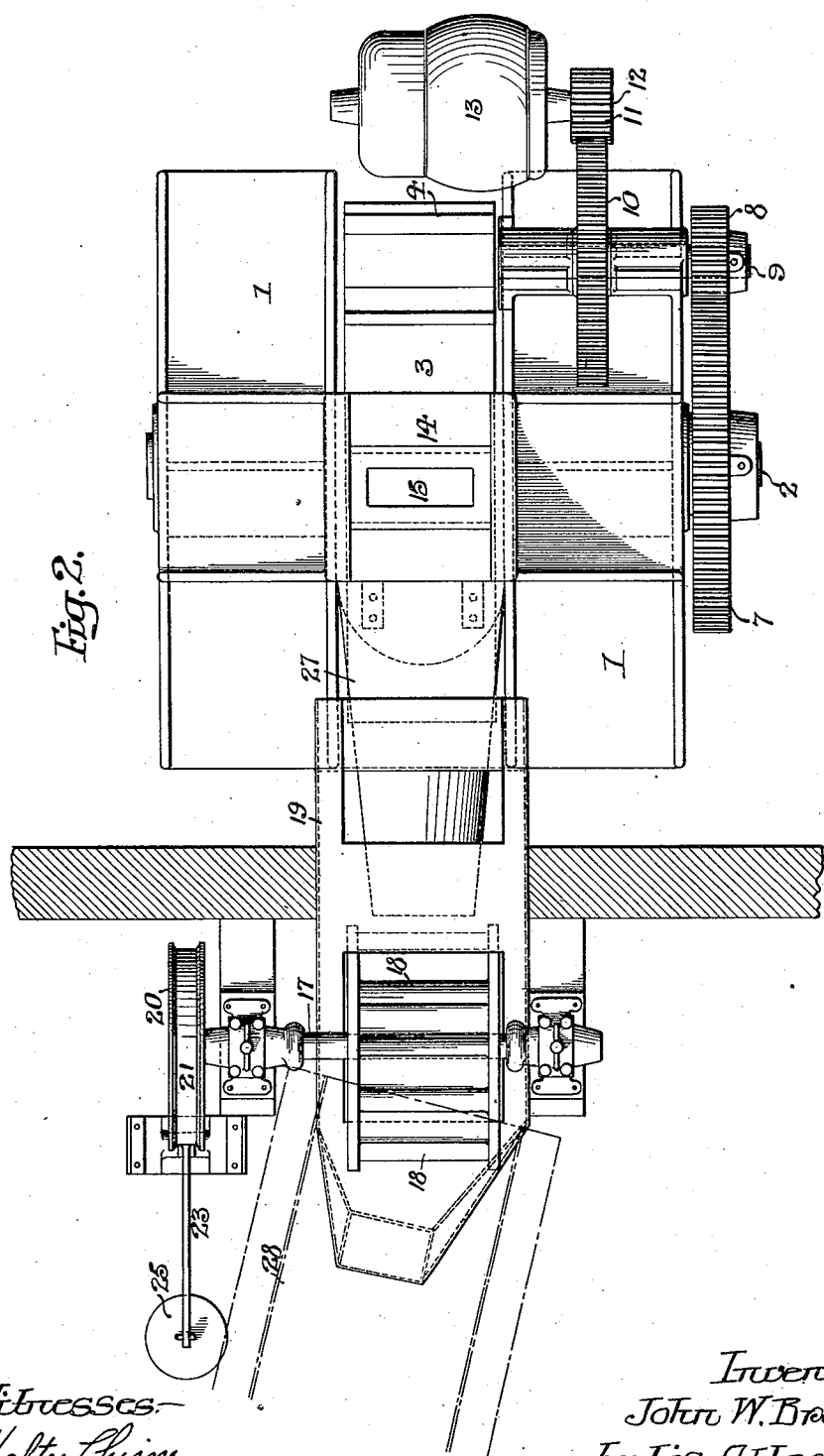

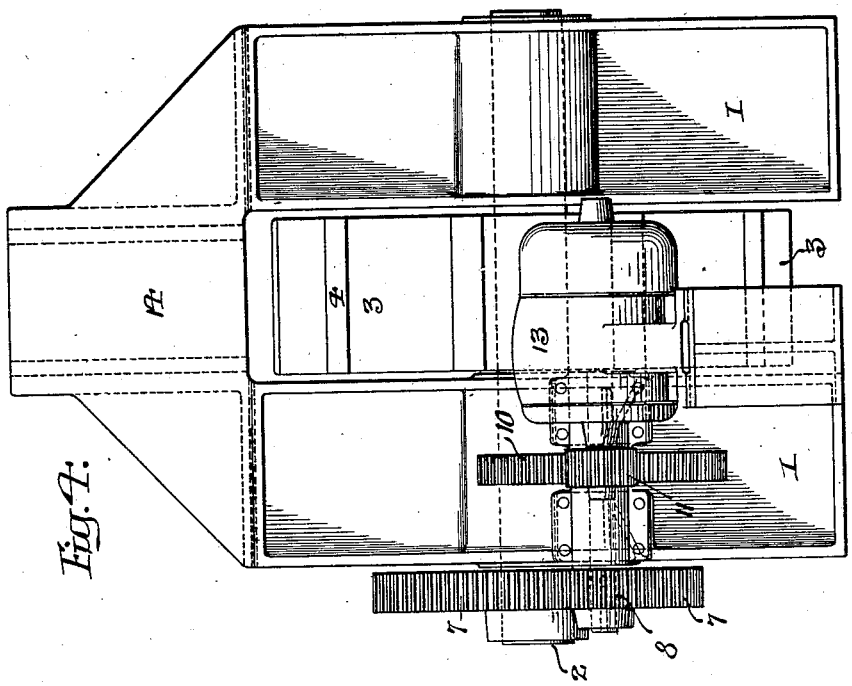

JOHN WILSON BROWN, JR., OF PHILADELPHIA, PENNSYLVANIA, ASSIGNOR TO THE ENTERPRISE MANUFACTURING COMPANY OF PENNSYLVANIA, OF PHILADELPHIA, PENNSYLVANIA, A CORPORATION OF PENNSYLVANIA.

PIG-IRON BREAKER.

1,011,736.  Specification of Letters Patent.  Patented Dec. 12, 1911.

Application filed May 12, 1910. Serial No. 560,912.

*To all whom it may concern:*

Be it known that I, JOHN WILSON BROWN, Jr., a citizen of the United States, residing in Philadelphia, Pennsylvania, have invented certain Improvements in Pig-Iron Breakers, of which the following is a specification.

The object of my invention is to construct a machine which will properly and quickly break pig iron or other cast metals into comparatively small pieces. This object I attain in the following manner, reference being had to the accompanying drawings, in which:

Figure 1, is a side view of my improved pig breaker, partly in section; Fig. 2, is a plan view partly in section with the floor removed; Fig. 3, is an end view looking in the direction of the arrow $a$, Fig. 1; and Fig. 4, is an end view looking in the direction of the arrow $b$, Fig. 1.

1 is the frame of my improved pig breaker and mounted in bearings in this frame is a shaft 2 on which is mounted the breaker wheel 3. This breaker wheel has a series of teeth 4. The front of each tooth is on a radial line with the center of the shaft while the back of the tooth gradually tapers off to the base of the next tooth.

I preferably mount a steel plate 5 on the face of each tooth and secure the plates to the teeth by bolts 6, as clearly shown in Fig. 1. Thus making the striking faces of the teeth of hard metal and the teeth have sufficient body to resist any blow, as it will be understood that the wheel 3 is rotated at such a speed that it strikes a blow.

On the shaft is a gear wheel 7 which meshes with a pinion 8 on a shaft 9, and on this shaft is a gear wheel 10 which meshes with a pinion 11 on a shaft 12 of an electric motor 13 in the present instance. While I have shown an electric motor it will be understood that any other suitable motor may be used for driving the wheel.

Mounted on the frame 1 is a feed box 14 having a passage 15. This passage is directly above the wheel 3 and the pig is fed into this passage end on, so that a portion of the pig will project into the path of the teeth 4 of the wheel and will be broken off by the action of the wheel.

Under ordinary conditions the wheel would break the pig and throw it with considerable force and, in order to prevent the broken pig doing damage and to deflect its direction of movement, I provide a toothed wheel 16 which is mounted on a shaft 17 adapted to bearings on suitable framework, and the teeth 18 of this wheel are made as clearly shown in Fig. 1; being rounded and curved and arranged tangentially so that when the piece of pig is broken off it will strike the wheel below the center of the shaft 17, causing it to turn due to impact, but as the wheel is frictionally mounted it simply moves so as to cushion the blow, and the piece of pig drops onto the inclined chute 19.

In order to regulate the friction upon the wheel 16, I preferably mount a band wheel 20 on the shaft 17 and pass a band 21 around the wheel; the band being secured to a fixed point at 22 and attached to a lever 23 which is pivoted at 24. From the end of this lever are suspended adjustable weights 25 so that by adjusting the weights the proper amount of friction can be given to the wheel so that it will only turn sufficiently to take up the shock caused by the striking of the broken pig against the wheel.

The chute 19 is continued and forms the chute for the coke or other fuel which is introduced into the cupola furnace with the broken pig. An opening 26 in the floor directly above the chute allows for the discharge of coke into the chute.

27 is a rearward continuation of the chute 19 which extends to and is secured to the pig breaker frame so that there is no liability of the broken pig flying to one side or the other of the apparatus, but it must pass through the extension 27 and the upper end of the chute 19 and will strike the lower portion of the wheel 16 before it is deflected; the wheel deflecting the broken pig as described above and when the pig falls into the inclined chute 19 it is directed into an endless conveyer 28 which carries the broken pig to the top of the cupola furnace where it is discharged in the ordinary manner.

It will be seen by the above construction that I make a very simple and effective pig breaker, which can be fed without danger to the operator and the force of the blow will be taken by a rotating wheel, which is frictionally mounted so as to retard the movement of the pig and allow it to fall into the proper channel.

By using the rotating wheel I am enabled to properly direct the broken pig and the blows will be distributed throughout the working face of the wheel, making the device very effective and substantial.

I claim:

1. The combination in a machine for breaking metal pigs, of a frame, a shaft mounted in the frame, a toothed wheel on the shaft, means for driving the shaft, a box having an opening in line with the wheel so that the pig can be fed through the opening by gravity into the path of the wheel, and a shock absorber mounted in advance of the breaker and arranged to receive the blow of the pig as it is projected from the wheel.

2. The combination of a frame, a shaft mounted in the frame, a toothed wheel on the shaft, means for driving the shaft, a box mounted on the frame above the wheel, said box having an opening through which the pig is fed into the path of the wheel, a chute located in advance of the breaker, and a shock absorber above the chute in line with the pig as it is projected from the toothed wheel.

3. The combination of a frame, a shaft mounted in bearings in the frame, a toothed wheel on the shaft, a box located above the wheel and having an opening through which the pig is fed into the path of the teeth of the wheel, and a rotating shock absorber located so as to receive the blow of the pig as it leaves the toothed wheel.

4. The combination of a rotating wheel, means for guiding a pig into the path of the wheel, a rotating shock absorber to receive the blow of the pig as it is projected from the wheel, and an adjustable friction device for creating friction upon the wheel.

5. The combination of a frame, a shaft mounted on the frame, a toothed wheel on the shaft, means for driving the shaft, a box mounted on the frame above the wheel and having an opening in line with the teeth thereof so that a pig can be fed by gravity into the path of the teeth of the wheel, a chute in front of the frame, and a shock absorber above the chute.

In testimony whereof, I have signed my name to this specification, in the presence of two subscribing witnesses.

JOHN WILSON BROWN, Jr.

Witnesses:
Wm. E. Shupe,
Wm. A. Barr.